(12) United States Patent
Holt et al.

(10) Patent No.: US 8,978,292 B1
(45) Date of Patent: Mar. 17, 2015

(54) CROSS-LINKED BIOFIBER PRODUCTS AND PROCESSES FOR THEIR MANUFACTURE

(75) Inventors: Gregory A. Holt, Brownfield, TX (US); Edward Lee, Manteno, IL (US); Watt Andy Ellis, III, Centre, AL (US); Thomas C. Wedegaertner, Cary, NC (US)

(73) Assignee: The United States of America, as represented by The Secretary of Agriculture, Washington, DC (US)

( * ) Notice: Subject to any disclaimer, the term of this patent is extended or adjusted under 35 U.S.C. 154(b) by 961 days.

(21) Appl. No.: 12/873,613

(22) Filed: Sep. 1, 2010

Related U.S. Application Data

(63) Continuation of application No. 12/316,525, filed on Dec. 12, 2008, now Pat. No. 7,788,847, which is a continuation of application No. 11/121,238, filed on May 3, 2005, now abandoned.

(51) Int. Cl.
    *A01G 7/00* (2006.01)
(52) U.S. Cl.
    USPC .................................................. 47/9
(58) Field of Classification Search
    USPC .......................................... 47/9, 56, 58.1 SC
    See application file for complete search history.

(56) References Cited

U.S. PATENT DOCUMENTS

| | | | | |
|---|---|---|---|---|
| 4,229,442 A | * | 10/1980 | Pinckard | 424/725 |
| 5,573,190 A | * | 11/1996 | Goossen | 241/27 |
| 5,942,029 A | * | 8/1999 | Spittle | 106/164.3 |
| 6,029,395 A | * | 2/2000 | Morgan | 47/9 |

FOREIGN PATENT DOCUMENTS

CA            263672        * 10/1976

* cited by examiner

*Primary Examiner* — Monica Williams
(74) *Attorney, Agent, or Firm* — John D. Fado; G. Byron Stover

(57) ABSTRACT

Value-added compositions such as mulches, insulation, and animal bedding may be produced from cotton waste. These compositions are formed from mixtures of at least two cellulosic, biofiber components, wherein one or both of the components are fiberized. The compositions of this invention include mixtures of:
a. a first cellulosic component of cotton byproducts, and
b. a second cellulosic component which is visible to the naked eye, and which includes hay, grass, kenaf, straw, plant residue remaining following the harvest of crops such as cereal grains, rice, soybeans, and grass seed, wood, sawdust, wood pulp, paper, or mixtures of any of the above, wherein one or both of the first or second cellulosic component are fiberized and the fibers of the fiberized component are intermixed with and entangled about the other component in a 3-dimensional matrix.

34 Claims, 1 Drawing Sheet

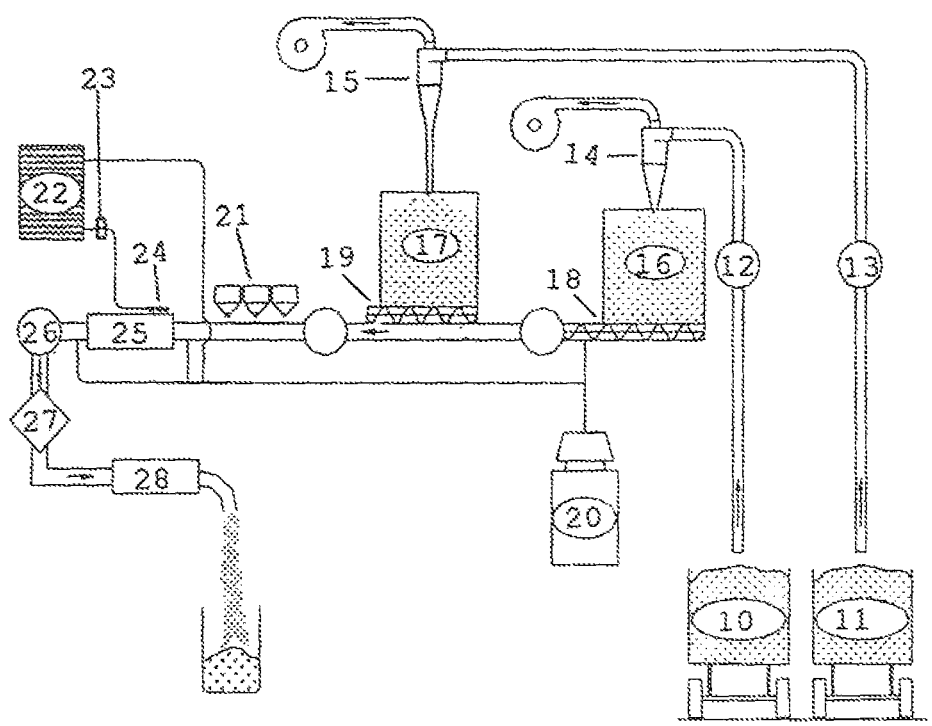

US 8,978,292 B1

CROSS-LINKED BIOFIBER PRODUCTS AND PROCESSES FOR THEIR MANUFACTURE

CROSS-REFERENCE TO RELATED APPLICATIONS

This is a continuation of Ser. No. 12/316,525, filed on Dec. 12, 2008, which was a continuation of Ser. No. 11/121,238, filed on May 3, 2005, now abandoned, the contents of which are hereby incorporated by reference herein in their entirety.

BACKGROUND OF THE INVENTION

1. Field of the Invention

This invention relates to novel cross-linked biofiber compositions prepared from cotton byproducts which are useful as mulches, animal bedding, or insulation, and a process for their production.

2. Description of the Prior Art

Utilizing the 2.5 million plus tons (calculated from data in 1997 Census of Agriculture) of byproducts from cotton gins has been a topic of research for years. Some of this research has focused on various applications ranging from using cotton gin byproducts (CGB) as fire logs (Karpiscak et al., 1982, Densification of cotton gin trash into fireplace fuel, Proc of the Symposium of Cotton Gin Trash Utilization Alternatives, National Science Foundation et al., pp. 87-99.), an energy source (Beck and Clements, 1982, Ethanol production from cotton gin trash, Proc. of the Symposium of Cotton Gin Trash Utilization Alternatives, National Science Foundation et al., pp. 163-181; Lacewell et al., 1982, Pelleting cotton gin trash for energy, Proc. of the Symposium of Cotton Gin Trash Utilization Alternatives, National Science Foundation et al., pp. 141-161; LePori et al., 1982, Energy from cotton gin trash, Proc. of the Symposium of Cotton Gin, Trash Utilization Alternatives, National Science Foundation et al., pp. 101-117; Parnell et al., 1991, Converting cotton gin trash into usable energy—technical and economical considerations, Proc. Beltwide Cotton Conferences 2:969-972; White et al., 1996, Conversion of cotton plant and cotton gin residues to fuels by the extruder-feeder liquifaction process, Bioresource-Technology 56:1, 117-123), livestock feed (Holloway et al., 1974, Feeding gin trash to beef cattle, Bulletin Mississippi Ag. Exp. Stn. 818, 9p; Conner and Richardson; 1987, Utilization of cotton plant residues by ruminants, Journal of Animal Science 65(4) 1131-1138; Poore and Rogers, 1995, Feeding whole cottonseed and other cotton by-products to beef cattle, Veterinary-Medicine 90:11, 1077-1087), raw materials in asphalt roofing products (Kolarik and Smith, 1978, Economic evaluation of south plains (Texas) ginning waste as a raw material in the production of roofing felt, Report prepared for Cotton Incorporated, Agreement No. 78-383, 72p), and compost (Hills, 1982, Composting gin trash in California, Proc. of the Symposium of Cotton Gin Trash Utilization Alternatives, National Science Foundation et al., pp. 63-86; Shumack et al., 1991, Using gin trash in composted soil ingredients, Proc. Beltwide Cotton Conferences 1: 498-499; Truhett, 1994, Developing markets for composted gin waste, Proc. Beltwide Cotton Conferences 1:609; Ayers, 1997, Farmer composting of cotton gin trash, Proc. Beltwide Cotton Conferences 2: 1615-1616). The amount of research that has been performed on this subject is more extensive than indicated in the examples above. For amore thorough overview of previous research efforts, refer to Thomasson (1990, A review of cotton gin trash disposal and utilization, Proc. Beltwide Cotton Conferences 689-705).

More recently, Holt et al. (U.S. Pat. No. 6,383,548) developed a process for converting cotton gin trash and other cotton byproducts into value added products. As described therein, the cotton byproducts are treated with a gellable polysaccharide and subsequently or concurrently ground and compacted. The resultant products may be used as livestock feed, fertilizer, fuel, or mulch.

However, despite these advances, the need remains for improved value added products generated from cotton byproducts, as well as other agricultural byproducts.

SUMMARY OF THE INVENTION

We have now discovered novel value-added compositions produced from cotton waste, and a method for their production. These compositions are formed from mixtures of at least two cellulosic, biofiber components, wherein one or both of the components are fiberized. The compositions of this invention include mixtures of:

a. a first cellulosic component of cotton byproducts, and
b. a second cellulosic component which is visible to the naked eye, and which includes hay, grass, kenaf, straw, plant residue remaining following the harvest of crops such as cereal grains, rice, soybeans, and grass seed, wood, sawdust, wood pulp, paper, or mixtures of any of the above, wherein one or both of the first or second cellulosic component are fiberized, and the fibers of the fiberized component are intermixed with and entangled about the other component in a 3-dimensional matrix.

In accordance with this discovery, it is an object of this invention to provide improved value added products from cotton waste.

Another object of this invention is to provide biodegradable mulches providing improved protection from soil erosion.

A further object of this invention is to provide improved hydromulches having superior coverage and soil adhesion, and which exhibit improved dewatering characteristics.

Other objects and advantages of this invention will become readily apparent from the ensuing description.

BRIEF DESCRIPTION OF THE DRAWINGS

FIG. 1 shows a schematic diagram of one preferred embodiment of the process for producing the biofiber compositions of the invention.

DETAILED DESCRIPTION OF THE INVENTION

In accordance with this invention, there are provided compositions which are suitable for a variety of applications, including animal bedding, insulation, or mulches. However, the compositions are preferably employed as mulches including bedding mulches and seed establishment mulches, for example, to prevent soil erosion, prevent or reduce weed growth, increase soil water retention, and/or moderate soil temperature. Moreover, the compositions may be used as sprayable hydromulches (i.e., hydraulic mulches), or as preformed, rolled blankets which are laid upon the soil. We have discovered that the compositions of the invention, when applied as a mulch, unexpectedly provide enhanced soil adherence (i.e., anchoring) and runoff protection while at the same time providing enhanced visual coverage over the soil. Further, when applied as a hydromulch, the compositions unexpectedly provide enhanced dewatering characteristics, and thus require less water to apply than conventional hydromulches, and the compositions also exhibit substantially less clumping and fouling of spraying equipment than either component when applied alone. "Dewatering" generally refers to the problem encountered during pumping of a hydromulch wherein the solid mulch material tends to separate in the tank and thus a greater proportion of water is actually sprayed, leaving a residual, "dewatered" sludge in the tank which requires the addition of greater amounts of water before it can be sprayed. When in an aqueous slurry, the compositions of this invention exhibit a significantly reduced tendency to separate, and a smaller amount of dewatered solids remain in the tank following a spraying application. Consequently, the volume of water necessary to resuspend and spray the remaining dewatered solids is also reduced.

The compositions of the invention are formulated as a mixture of at least two cellulosic biofiber components, one of which being a cotton byproduct, and a second component which is visible to the naked eye and can be prepared from a variety of plant materials or paper as will be described in greater detail hereinbelow.

Cotton byproducts suitable for use in the compositions of the invention may be obtained from a variety of cotton processing facilities, including but not limited to the byproducts (waste) from cotton gins, textile mills, and cottonseed oil mills. Depending upon the particular source selected, these byproducts primarily consist of one or more of burs, sticks, leaves, short staple lint, neps or motes, immature seeds, seed hulls, and seed coat fragments. Of these components, burs and sticks are generally present in the greatest amounts (by weight) in cotton gin waste, which is the preferred cotton byproduct for use herein.

The second cellulosic biofiber component may be selected from a variety of plant materials or paper, including, but not limited to, hay (such as grass, clover, alfalfa or other legumes), grasses, kenaf, straw, plant residue (including stalks, leaves, and husks) which remain after the harvest of crops selected from the group of cereal grains, rice, soybeans, and grass seed, wood (including chips or shavings), sawdust, wood pulp, paper (including shredded or ground), or mixtures of any two or more of the above. Of these, use of hay, grasses, kenaf, straw, and plant residues remaining after crop harvest, are preferred. Moreover, while sawdust is suitable for use in products intended for applications such as insulation, it is not desirable for use in mulches due to its small particle size.

Although either or both of these components may be fiberized, in the preferred embodiment the cotton byproducts are fiberized, and in the particularly preferred embodiment both components are fiberized. Moreover, in accordance with this invention, if the second component is wood, it is preferably softened by steaming or soaking prior to fiberization. For the purposes of this invention, "fiberized" refers to the longitudinal splitting and/or sheering of the material along the length of the fibers to produce individual fibers which are dispersed such that the integrity of the individual fibers in the fibrous material is substantially retained. These fibers are then subsequently intertwined about one another and the other component of the composition in a 3-dimensional array or matrix. As used herein, fiber integrity being "substantially retained" refers to greater than 50% of the individual fibers maintaining their initial length (i.e., their length prior to being fiberized). In other words, less than 50% of the individual fibers are reduced in length by the fiberization step as determined by sieve analysis.

As described in further detail hereinbelow, in one preferred embodiment either or both of the cotton byproduct component and the second cellulosic biofiber component are chopped or ground prior to fiberization. However, the extent of chopping or grinding should not be so extensive that the fibers are reduced to a size which is too short to facilitate intertwining about one another to form a stable 3-dimensional matrix. The actual suitable minimum fiber length will vary with the particular application of the composition. Thus, for mulches in general, more than 60% by weight of each of the first and second components in the final composition should have a fiber length greater than 0.18 mm, and more than 40% by weight of the first and second components, preferably more than 50%, should have a fiber length greater than 0.8 mm (all measured after fiberization). For roll-out mulch mats and bedding mulches, the fiber length is preferably even greater. Specifically, for roll-out mulch mats, preferably more than 40% by weight, and most preferably more than 50%, of each of the first and second components in the final composition have a fiber length greater than 1.4 mm. For bedding mulches, preferably more than 40% by weight, and most preferably more than 50% by weight, of each of the first and second components in the final composition have a fiber length greater than 4.8 mm. In contrast, suitable fiber lengths for insulation materials may be lower, with more than 40% by weight, and most preferably more than 50% by weight, of each of the first and second components in the final composition having a fiber length greater than 0.2 mm. From the description above, it is clear that the fiberized cellulosic materials of this invention, and specifically fiberized cotton byproducts, are physically and structurally distinct from the ground and compacted cotton byproducts of the Holt et al. patent (U.S. Pat. No. 6,383,548).

Fiberization of the biofiber components may be effected using a variety of techniques known in the art, and the particular technique is not critical. Without being limited thereto, in the preferred embodiment, the first or second components may be fiberized by tearing or ripping the material along its length as it moves or is conveyed between a pair of discs or generally cylindrical rollers. These discs are positioned with the axes thereof approximately parallel to one another, and with their outer surfaces adjacent or contiguous, either in contacting or closely spaced relationship. The discs are adapted or constructed to rotate in opposite directions to promote passage and flow of the forage material therebetween with, for example, one disc rotating clockwise, and the other rotating counterclockwise. Alternatively, one of the discs may be stationary.

Following fiberization the first and second components are sufficiently mixed together to intermingle and entangle the fibers of one component about the other component (or to intermingle and entangle the fibers of both components if they are each fiberized) and form a substantially homogeneous mixture of the two components in a 3-dimensional cross-linked matrix. Alternatively, in the event that both components are fiberized, it is understood that the first and second components may be mixed prior to or concurrently with fiberization. This entanglement of the fibers provides a strong mulch matrix that effectively resists movement by exterior forces such as water and wind to a degree that heretofore has not been available in conventional mulches without the addition of synthetic additives.

The relative amounts of the first and second components are somewhat variable, and suitable ratios of the first component (cotton byproducts) to the second component are between about 5:95 to about 7:3, by weight, preferably between about 1:9 to about 6:4, by weight.

In one optional embodiment which is particularly preferred for compositions intended for use as hydromulches, prior to fiberization, the cotton byproduct component is chopped and ground in a conventional grinder or shredder to reduce the size of the material to a size more readily amenable to subsequent pumping and spraying. Thus, without being limited thereto, for mulches the material is preferably cut to a mean size (length) less than about 1 inch, particularly less than about ½ inch. Depending upon the selection of the material for the second component, and particularly when using wood or crop harvest residues, it is also preferred to treat the second component in like fashion. In another optional embodiment, at least the cotton byproduct component of the composition is preferably subjected to optional heat sterilization to kill substantially any seeds and/or weeds present in the raw byproducts, as well as any pathogenic bacteria or fungi therein. Heat sterilization can be effected using dry heat, but is preferably accomplished using steam.

The composition of the first and second biofiber components may be used directly as a dry mix, or it may be further formulated with water as an aqueous slurry. For example, the dry mix can be applied directly as a mulch, insulation, or animal bedding material. Alternatively, because of the durability afforded by the intermingling of the fibers, the composition can be laid out and shaped or pressed into a mat for use as an erosion control blanket or as insulation. However, in a preferred embodiment, the composition is formulated with water for use as a hydromulch. In this embodiment, the dry formulation is mixed with a sufficient amount of water to form a slurry which can be pumped and applied using conventional spraying equipment. The resultant slurry may be optionally intermittently agitated to prevent settling. The actual amount of water added may vary and may be determined by the user. Without being limited thereto, the preferred amount of water added is approximately 1 to 1.5 gallons per pound of solids (i.e., the volume of the first and mass of the second components), most preferably approximately 1.25 gallons per pound, although the amount of water may be increased depending on the hose used and its length or for tower applications. Once slurried, the composition may be sprayed over the soil or any other desired ground surface. After application, the composition will dry, leaving a durable cross-linked biodegradable mulch matrix which provides excellent soil moisture retention and moisture infiltration, erosion control, coverage, and loft.

A variety of optional agents may be added to the first or second cellulosic components or the mixture thereof, before, during or after processing. For example, when producing mulches, one or more of surfactants, viable, mature plant seeds (such as seeds of the desired crop or ground cover), fertilizers (including animal manures) or soil conditioners such as urea or phosphorous, pesticides (including herbicides, insecticides, and fungicides), and colorants or dyes, may be added. In one preferred embodiment, one or more of tackifiers, polymers such as polyacrylamide or other linear polymers, and flocculating agents (for water clarification) may be added. Addition of fire retardants is preferred for compositions intended for use as insulation.

FIG. 1 shows a schematic diagram of a preferred process for the production of the compositions of the invention wherein both of the first and second components are fiberized. As shown therein, the first and second components are delivered from bins 10 and 11 to grinders or shredders 12 and 13, and then to cyclone separators 14 and 15, respectively, for precleaning and to remove dirt and sand. From the cyclone separator the cleaned components are delivered to bins 16 and 17, and subsequently by screw conveyors 18 and 19 for further processing. The cotton byproducts are further subjected to steam sterilization using steam from boiler 20. Optional adjuvants may be added though ingredient feeders 21, or polymer in mixing tank 22 may be added through pump 23 and spray nozzles 24. The first and second components and any added adjuvants are then subjected to initial mixing in mixer 25. The mixed material is then delivered to a fiberizer 26 such as a disc mill where both components are fiberized as described hereinabove such that the fibers of the two components are intermingled and entangled about one another. Following fiberization, the composition is dried in drier 27 and subsequently cooled at 28 to form the final product.

It is understood that the foregoing detailed description is given merely by way of illustration and that modifications and variations may be made therein without departing from the spirit and scope of the invention.

We claim:

1. A biofiber composition comprising a mixture of:
    a. a first cellulosic component comprising cotton byproducts, and
    b. a second cellulosic component which is visible to the naked eye, comprising hay, grass, kenaf, straw, plant residue remaining following the harvest of crops selected from the group consisting of cereal grains, rice, soybeans, and grass seed, wood, sawdust, wood pulp, paper, or mixtures thereof,
wherein one or both of said first cellulosic component and said second cellulosic component are fiberized and the fibers of the fiberized component are intermixed with and entangled about the other said component in a 3-dimensional matrix.

2. The composition of claim 1 wherein said cotton byproducts comprise burs, sticks, leaves, motes, neps, immature seeds, seed hulls, seed coat fragments, or mixtures thereof.

3. The composition of claim 2 wherein said cotton byproducts comprise burs and sticks.

4. The composition of claim 3 wherein said burs and sticks are present in the greatest amount by weight in said cotton byproducts.

5. The composition of claim 1 wherein said cotton byproducts are selected from the group consisting of cotton gin byproducts, byproducts from textile mills, byproducts from cottonseed oil mills, and mixtures thereof.

6. The composition of claim 1 wherein said second cellulosic component comprises hay, grass, kenaf, straw, plant residue remaining following the harvest of crops selected from the group consisting of cereal grains, rice, soybeans, and grass seed, or mixtures thereof.

7. The composition of claim 1 wherein only said first cellulosic component is fiberized.

8. The composition of claim 1 wherein only said second cellulosic component is fiberized.

9. The composition of claim 1 wherein both of said first cellulosic component and said second cellulosic component are fiberized.

10. The composition of claim 1 wherein the ratio of said first cellulosic component to said second cellulosic component is between about 5:95 to about 7:3, by weight.

11. The composition of claim 10 wherein the ratio of said first cellulosic component to said second cellulosic component is between about 1:9 to about 6:4, by weight.

12. The composition of claim 1 further comprising water.

13. The composition of claim 12 wherein said water is present in an amount effective to form an aqueous slurry of said first cellulosic component and said second cellulosic component.

14. The composition of claim 13 wherein the amount of said water is approximately 1 to 1.5 gallons of water per pound of said first cellulosic component and said second cellulosic component, combined, in said composition.

15. The composition of claim 14 further comprising a surfactant or dye.

16. The composition of claim 1 further comprising viable, mature plant seeds.

17. The composition of claim 1 further comprising fertilizer.

18. The composition of claim 1 further comprising one or more tackifiers or flocculating agents.

19. The composition of claim 1 further comprising one or more flame retardant additives.

20. The composition of claim 1 further comprising one or more pesticides.

21. The composition of claim 1 wherein said one or both of said first cellulosic component and said second cellulosic component which are fiberized comprise individual fibers which are dispersed such that the integrity of the individual fibers in said component is substantially retained.

22. The composition of claim 21 wherein said one or both of said first cellulosic component and said second cellulosic component have been fiberized by tearing or ripping the component along its length as it moves or is conveyed between a pair of discs or generally cylindrical rollers.

23. The composition of claim 21 wherein said 3-dimensional matrix comprises a substantially homogeneous mixture of said fibers of the fiberized component intermixed with and entangled about the other said component.

24. The composition of claim 1 wherein said cotton byproducts comprise cotton gin waste.

25. A method for making a biofiber composition comprising
A. providing:
  a. a first cellulosic component comprising cotton byproducts, and
  b. a second cellulosic component which is visible to the naked eye, comprising hay, grass, kenaf, straw, plant residue remaining following the harvest of crops selected from the group consisting of cereal grains, rice, soybeans, and grass seed, wood, sawdust, wood pulp, paper, or mixtures thereof, and
B. fiberizing one or both of said first cellulosic component and said second cellulosic component, and mixing said first cellulosic component and said second cellulosic component effective to intermingle and entangle the fiberized component about the other said component in a 3-dimensional matrix.

26. The method of claim 25 comprising fiberizing said first cellulosic component.

27. The method of claim 25 comprising fiberizing both of said first cellulosic component and said second cellulosic component.

28. The method of claim 27 wherein said mixing is prior to or concurrent with said fiberizing.

29. The method of claim 25 wherein said fiberizing comprises the longitudinal splitting and/or sheering of said component along the length of the fibers to produce individual fibers which are dispersed such that the integrity of the individual fibers in said component is substantially retained.

30. The method of claim 29 wherein said fiberizing comprises tearing or ripping the component along its length as it moves or is conveyed between a pair of discs or generally cylindrical rollers.

31. The method of claim 29 wherein said mixing is effective to intermingle and entangle said fibers of the fiberized component about the other said component in a substantially homogeneous mixture in said 3-dimensional matrix.

32. The method of claim 25 wherein said cotton byproducts comprise cotton gin waste.

33. The method of claim 32 wherein said cotton byproducts comprise burs and sticks.

34. The method of claim 33 wherein said burs and sticks are present in the greatest amount by weight in said cotton byproducts.

* * * * *